United States Patent [19]
Kung et al.

[11] Patent Number: 5,850,470
[45] Date of Patent: Dec. 15, 1998

[54] NEURAL NETWORK FOR LOCATING AND RECOGNIZING A DEFORMABLE OBJECT

[75] Inventors: Sun-Yuan Kung; Shang-Hung Lin, both of Princeton; Long-Ji Lin, Kendall Park; Ming Fang, Cranbury, all of N.J.

[73] Assignees: Siemens Corporate Research, Inc.; The Trustees of Princeton University, both of Princeton, N.J.

[21] Appl. No.: 521,176

[22] Filed: Aug. 30, 1995

[51] Int. Cl.[6] .............................. G06K 9/00; G06K 9/62; G06E 1/00; G06E 3/00
[52] U.S. Cl. .................... 382/157; 382/117; 382/118; 382/159; 382/116; 395/23
[58] Field of Search .................................. 382/155–160, 382/190, 115–118; 395/20–24

[56] References Cited

U.S. PATENT DOCUMENTS

| | | | |
|---|---|---|---|
| 5,412,738 | 5/1995 | Brunelli et al. | 382/115 |
| 5,465,308 | 11/1995 | Hutcheson et al. | 382/159 |
| 5,469,512 | 11/1995 | Fujita et al. | 382/118 |
| 5,497,430 | 3/1996 | Sadovnik et al. | 382/156 |
| 5,561,718 | 10/1996 | Trew et al. | 382/118 |
| 5,579,444 | 11/1996 | Dalziel et al. | 382/153 |
| 5,588,091 | 12/1996 | Alkon et al. | 395/24 |

OTHER PUBLICATIONS

Fadzil et al, "Human Face Recognition using Neural Networks", Image Processing, 1994 International Conference, pp. 936–939.
Wasserman, "Neural Computing, Theory and Practice"—pp. 167–188, 1989.

*Primary Examiner*—Leo H. Boudreau
*Assistant Examiner*—Bhavesh Mehta
*Attorney, Agent, or Firm*—Donald B. Paschburg

[57] ABSTRACT

A system for automatically detecting and recognizing the identity of a deformable object such as a human face, within an arbitrary image scene. The system comprises an object detector implemented as a probabilistic DBNN, for determining whether the object is within the arbitrary image scene and a feature localizer also implemented as a probabilistic DBNN, for determining the position of an identifying feature on the object such as the eyes. A feature extractor is coupled to the feature localizer and receives coordinates sent from the feature localizer which are indicative of the position of the identifying feature and also extracts from the coordinates information relating to other features of the object such as the eyebrows and nose, which are used to create a low resolution image of the object. A probabilistic DBNN based object recognizer for determining the identity of the object receives the low resolution image of the object inputted from the feature extractor to identify the object.

13 Claims, 6 Drawing Sheets

NEURAL NETWORK FOR LOCATING AND RECOGNIZING A DEFORMABLE OBJECT

FIELD OF INVENTION

The present invention relates generally to machine vision and more particularly, to a system which implements decision-based neural networks that operate to locate and recognize deformable objects such as the human face.

BACKGROUND OF THE INVENTION

The task of detecting and recognizing a deformable pattern or object is an important machine learning and computer vision problem. The task involves finding and identifying a specific but locally deformable pattern in an image, such as a human face. Machine learning and computer vision has many important commercial applications. Such applications include but are not limited to ATM, access control, surveillance, and video conferencing. Accordingly, machine learning and computer vision has attracted much attention in recent years.

Face recognition systems used in person identification, typically employ a face detector which determines the location and extent of one or more human faces in a non-uniform arbitrary image scene. Such systems find this task difficult because human faces are naturally structured and made up of deformable components such as the cheeks, the mouth, the forehead, etc. In any case, once the face has been located, the system then compares the face to other faces stored in a database in order to identify the person.

For systems used in many visual monitoring and surveillance applications, it is important that the system be capable of determining the position of the human eyes from an image or an image sequence containing a human face. Once the position of the eyes is determined, all of other important facial features, such as the positions of the nose and the mouth, can be determined. This information can then be used for a variety of tasks, such as to recognize a face from a given face database The key issue and difficulty in face detection is to account for the wide range of allowable facial pattern variations in a given image scene. In the past, there have been three main approaches for dealing with these pattern variations, namely: (1) the use of correlation templates, (2) spatial image invariants, and (3) view-based eigen-spaces, etc.

Correlation templates compute a similarity measurement between a fixed target pattern and the candidate image location. If the output exceeds a certain threshold, then a match is confirmed, i.e., a face detected. There are some face detection systems that use a bank of several correlation templates to detect major facial subfeatures in an image scene. However, the performance of such systems is limited in that the class of all potential face patterns is too varied to be modeled by a simple bank of correlation templates.

Spacial image-invariance schemes assume that some common and unique spatial image relationships exist in all face patterns. Such a set of image invariants must be checked for positive occurrences of these invariants at all image locations. One particular image-invariance scheme for example, is based on the local ordinal structure of brightness distribution between different parts of a human face.

A very closely related approach to correlation templates is that of view-based eigen-spaces. This approach assumes that the set of all possible face patterns occupies a small and easily parameterizable sub-space in the original high dimensional input image vector space. Typically, the approach approximates the subspace of face patterns using data clusters and their principal components from one or more example sets of face images. An image pattern is classified as "a face" if its distance to the clusters is below a certain threshold, according to an appropriate distance metric. However, this approach has only been demonstrated on face images in substantially uniform backgrounds.

There are algorithms and techniques which presently exist for eye localization are generally based on Hough transform, geometry and symmetry check, and deformable models. Most of these algorithms and techniques are generally inadequate against shape changes, and are time consuming. Furthermore, none of these existing methods can locate eyes when the eyes are closed.

Neural network models have been found to be very amenable to face recognition systems. As is well known in the art, a neural network is generally an implementation of an algorithm which enables a computer to be adaptive by learning directly from inputted data which is used to "train" the computer to perform a certain task. This enables such a computer to process data that only somewhat resembles the training data. Moreover, such computers are also capable of processing incomplete or imperfect data or providing a measure of fault tolerance. Additionally, such computers can recognize complex interactions among the input variable of a system. Since neural networks are parallel, a large network can achieve real-time speeds making their application more practical in many areas.

A neural network is generally comprised of interconnected computational elements or units which operate in parallel and are arranged in patterns which broadly mimic biological neural networks. Each connection between computational elements is associated with a modifiable weight. In operation, a computational element converts a pattern of incoming signals into a single outgoing signal that it sends to other connected computational elements. It does this by multiplying each incoming signal by the weight on the connection and adds together all the weighted inputs to get a quantity called the total input. Then, the computational element uses an input-output function that transforms the total input into an outgoing signal. In order for the neural network to perform a specific task, the computational elements must be connected to each other in certain network arrangement, and the weights must be set appropriately. The connections determine how the computational elements will influence each other and the weights determine the strength of this influence.

It is, therefore, an object of the present invention to provide a decision-based neural network and system for implementing the network that locates and recognizes deformable objects with specific applications directed at detecting human faces and locating eyes in the faces.

SUMMARY OF THE INVENTION

A system for automatically detecting and recognizing the identity of a deformable object such as a human face, within an arbitrary image scene. The system comprises an object detector implemented as a probabilistic DBNN, for determining whether the object is within the arbitrary image scene and a feature localizer also implemented as a probabilistic DBNN, for determining the position of an identifying feature on the object such as the eyes. A feature extractor is coupled to the feature localizer and receives coordinates sent from the feature localizer which are indicative of the position of the identifying feature and also extracts from the coordinates information relating to other features of the object such as the eyebrows and nose, which are used to create a low resolution image of the object. A probabilistic DBNN based object recognizer for determining the identity of the object receives the low resolution image of the object inputted from the feature extractor to identify the object.

Also provided in the present invention is a method for automatically detecting and recognizing the identity of a deformable object within an arbitrary image scene. In the method, the image scene is preprocessed into subimages. Each of the subimages are compared with an object detector database which stores different versions of the object in order to determine whether any of the subimages is the object. The coordinates of an identifying feature on the object are then located by comparing the coordinates with a feature localizer database which stores coordinates indicative of different versions of the identifying feature. Information relating to other features of the object are extracted from the coordinates to create a low resolution image of the object. Next, the low resolution image of the object image is inputted into an object recognizer and the identity of the object is made.

BRIEF DESCRIPTION OF THE DRAWINGS

For a detailed understanding of the present invention, reference should be made to the following detailed description taken in conjunction with the accompanying drawings wherein.

DETAILED DESCRIPTION OF THE INVENTION

Although the present invention can be used to locate most any deformable pattern or object, the present invention is especially suited for use in face detection, eye localization and person identification. Accordingly the present invention will be described in this context.

Face detection, eye localization, and face recognition are essentially pattern classification problems. For example, in face detection a given pattern is classified into two classes, face or non-face. In the present invention, a probabilistic variant of a decision-based neural network (DBNN) is provided to perform this classification task. More specifically, both face detection and eye localization are implemented by a probabilistic DBNN which will be described later on in greater detail. For these applications, and more generally for any deformable pattern detection, there is only one subnet required in the DBNN. In the exemplary embodiment of the present invention, the subnet represents the face/eye class. Thus, for an input pattern x, if the discriminant function value of the subnet is larger than the threshold, then x is recognized as a face/eye. Otherwise, x is considered as a non-face/eye.

Figure 1:
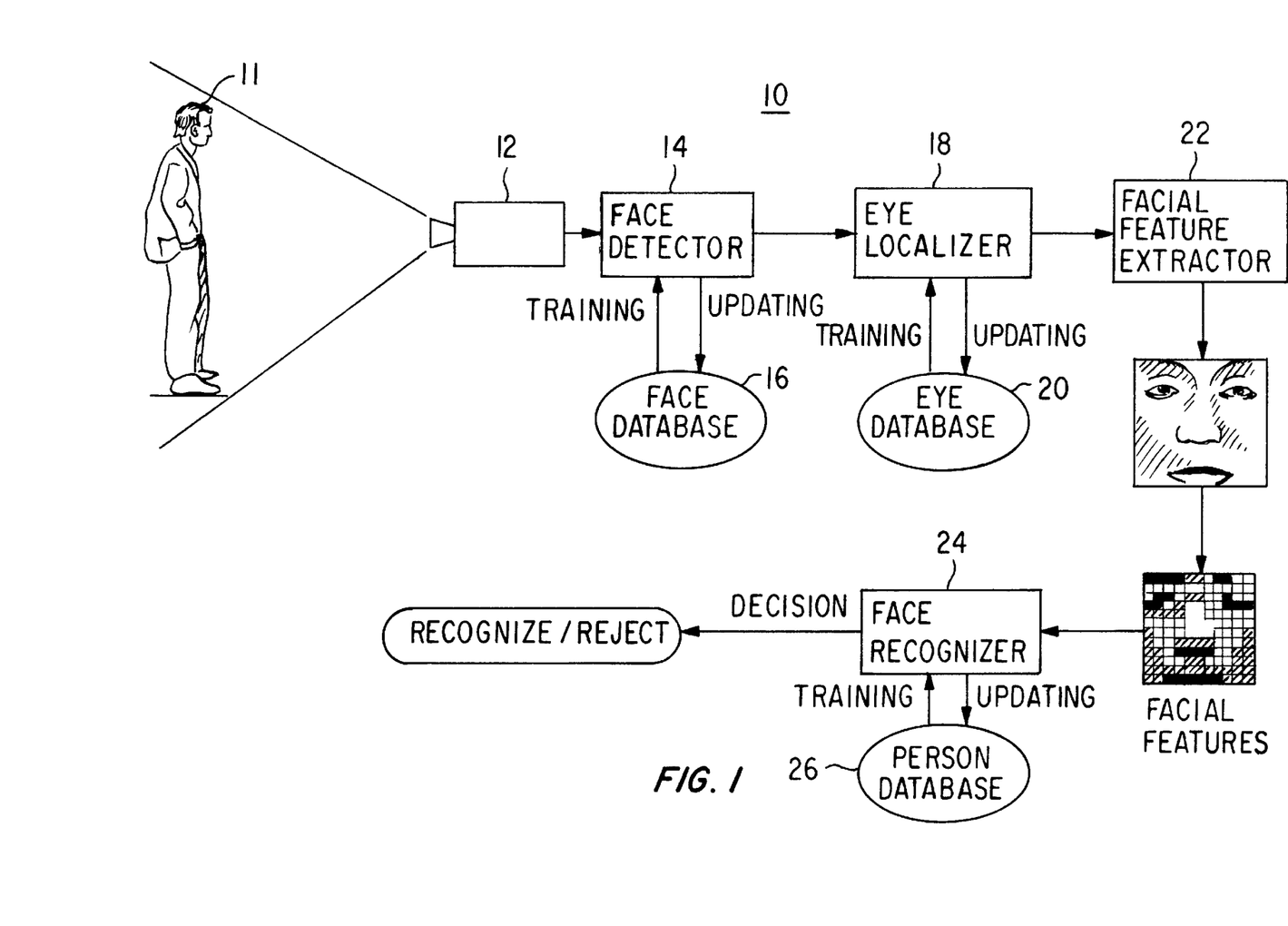
FIG. 1 is a diagrammatic view of an exemplary embodiment of the face locating and recognition system of the present invention.

Referring now to FIG. 1, an exemplary embodiment of a fully automatic face recognition system of the present invention is shown and designated by numeral 10. The system 10 comprises a video camera 12 for inputting an arbitrary image scene 11 with 320 by 240 pixels. A DBNN-based face detector 14 is coupled to the video camera 12 and includes a memory 16 which operates as a database for storing images of different human faces. The face detector 14 determines whether a face is within the arbitrary image scene 11. The data stored in the face database 16 is used to train the face detector 14. During training, updated network weighting parameters and thresholds are stored in the face database 16.

The input images from the video camera 12 are first preprocessed before inputting to the DBNN-based face detector 14. The inputs to the DBNN-based face detector 14 are a set of images with predefined coordinates. To detect a face in an input image, each of the possible subimages is processed to see if it represents a face. A confidence score is produced, indicating the system's confidence on this detection result. If the score is below some threshold, then no face is detected.

If positive identification of a face is made by the face detector 14, a DBNN-based eye localizer 18 which is coupled to the face detector 14, is activated to locate both eyes in the face image. Knowing the exact position of the eyes provides a very effective means for normalizing the face size and reorienting the face image. The pattern resolution used for the eyes is substantially higher than that used for the faces. Both the face detector 14 and the eye localizer 18 are insensitive to small changes in the head size, the face orientation (up to approximately 30%), and the presence of eye glasses.

The eye localizer 18 also includes a memory 20 which operates as a database for storing information pertaining to the coordinates of various different eyes. The eye localizer 18 determines the coordinates of each eye and then sends these coordinates to a facial feature extractor 22 as will be explained later below. The data stored in the eye database 20 is used to train the eye localizer 18. During training, updated network weighting parameters and thresholds are stored in the eye database 20.

The facial feature extractor 22 is coupled to the eye localizer 18 and uses the eye coordinates sent from the eye localizer 18 to extract a low resolution subimage which is approximately 140 by 100 pixels and corresponds to the face region. The facial region contains the eyebrows, the eyes, and the nose (excluding the mouth). Such a facial region yields a very high degree of confidence in that it offers stability against different facial expressions, hair styles, and mouth movement. Improved classification can also be gained from secondary facial features such as the hairline and the mouth.

The facial feature extractor 22 normalizes the intensities and the edges in the facial region (to a range between 0 and 1) to compensate for changing illumination. Edge filtering and histogram modification techniques can be applied to recondition the facial images. The normalized and reconditioned images of 140 by 100 pixels are then reduced to coarser feature vectors of approximately 13 by 9 pixels. Adopting lower resolution facial features provides substantial reductions in computational cost and storage space and increases the tolerance on face/eye location errors.

In order to assure sufficient diversity of real facial images in the training set, the algorithm takes the acquired sensor image and transforms it to create additional training exemplars otherwise known as virtual training patterns. Two kinds of training patterns are used. The first training pattern consists of positive patterns (face/eye patterns) which are used for reinforced learning. The second training pattern consists of negative patterns (non-face/eye patterns) which are used for antireinforced learning. The network weighting parameters and the thresholds are updated by this reinforced/antireinforced learning. A more detailed discussion of virtual pattern generation will be explained later below.

The feature vector generated by the facial feature extractor is then fed into a DBNN-based face recognizer 24 for recognition. The face recognizer 24 includes a memory 26 which operates as a database for storing person identification information.

The trained system can be easily adapted to a face verification application. Due to the distributed structure of a DBNN, any individual person's database may be individually retrieved for verification of his or her identity as proclaimed.

The DBNN techniques implemented in the face detector 14, the eye localizer 18 and the face recognizer 24 as described in the system 10 above can be applied in other similar systems for detecting virtually any type of deformable object. The discussion which follows immediately below details the probabilistic DBNN implemented in the above-described system.

The DBNN used in the present invention uses a distributed and localized updating rule based on reinforced and anti-reinforced learning strategy. The gradient of the discriminant function with respect to the weight parameters is used as an updating direction. The main merit of this is that it enables the border between any two classes to be settled mutually, with minimum side-effects on other borders. In the DBNN, the teacher only tells the correctness of the classification for each training pattern. The teacher is a set of symbols, $\tau = \{t_i\}$, which label the correct class for each input pattern. Unlike an approximation formulation, exact values of the teachers are not required. Accordingly, the objective of the training is to find a set of weights which yields a correct classification.

For complex pattern distribution, the discriminant function is usually a priori unknown. This leads to a credit assignment rule on when, what, and how to perform network updating. Its main purpose is to alleviate the problem of overtraining the networks. There are three main aspects of the training rule: when to update; what to update; and how to update the weights.

Under the training rule, knowing when to update is determined by a selective training scheme for example, which updates the weight only when there is misclassification. Since the rule is distributive and localized, knowing what to update is accomplished by applying reinforced learning to the subnet corresponding to the correct class and anti-reinforced learning to the subnet corresponding to non-correct class. Updating under the rule is accomplished by adjusting the boundary by updating the weight vector w either in the direction of the gradient of the discriminant function (i.e., reinforced learning) or opposite to that direction (i.e., antireinforced learning).

The following describes the Decision-Based Learning Rule discussed immediately above: Suppose that $S=\{x^{(1)}, \ldots, x^{(N)}\}$ is a set of given training patterns, each corresponding to one of the M classes $\{\omega_i, i=1, \ldots, M\}$. Each class is modeled by a subnet with discriminant functions, for example, $\phi(x, w_i)$ $i=1, \ldots, M$. Suppose that the m-th training pattern $x^{(m)}$ is known to belong to class $\omega_i$ and;

$$\phi(x^{(m)}, w_j^{(m)}) > \phi(x^{(m)}, w_l^{(m)}), \forall l \neq j \quad (1)$$

Accordingly, the winning class for the pattern is the jth class (subnet). When and only when $j \neq i$, (i.e., when $x^{(m)}$ is misclassified), the following update will be performed:

Reinforced Learning: $w_i^{(m+1)} = w_i^{(m)} + \eta \nabla \phi(x, w_i)$

Antireinforced Learning: $w_j^{(m+1)} = w_j^{(m)} - \eta \nabla \phi(x, w_j)$ $\quad (2)$ Typically, one output node is designated to represent one class. The All-Class-in-One-Network (ACON) structure is adopted by in a conventional MLP, where all the classes are lumped into one super-network. The supernet has the burden of having to simultaneously satisfy all the teachers, so the number of hidden units K tends to be large. Empirical results have confirmed that the convergence rate of ACON degrades drastically with respect to the network size because the training of hidden units is influenced by potentially conflicting signals from different teachers.

Figure 2A:
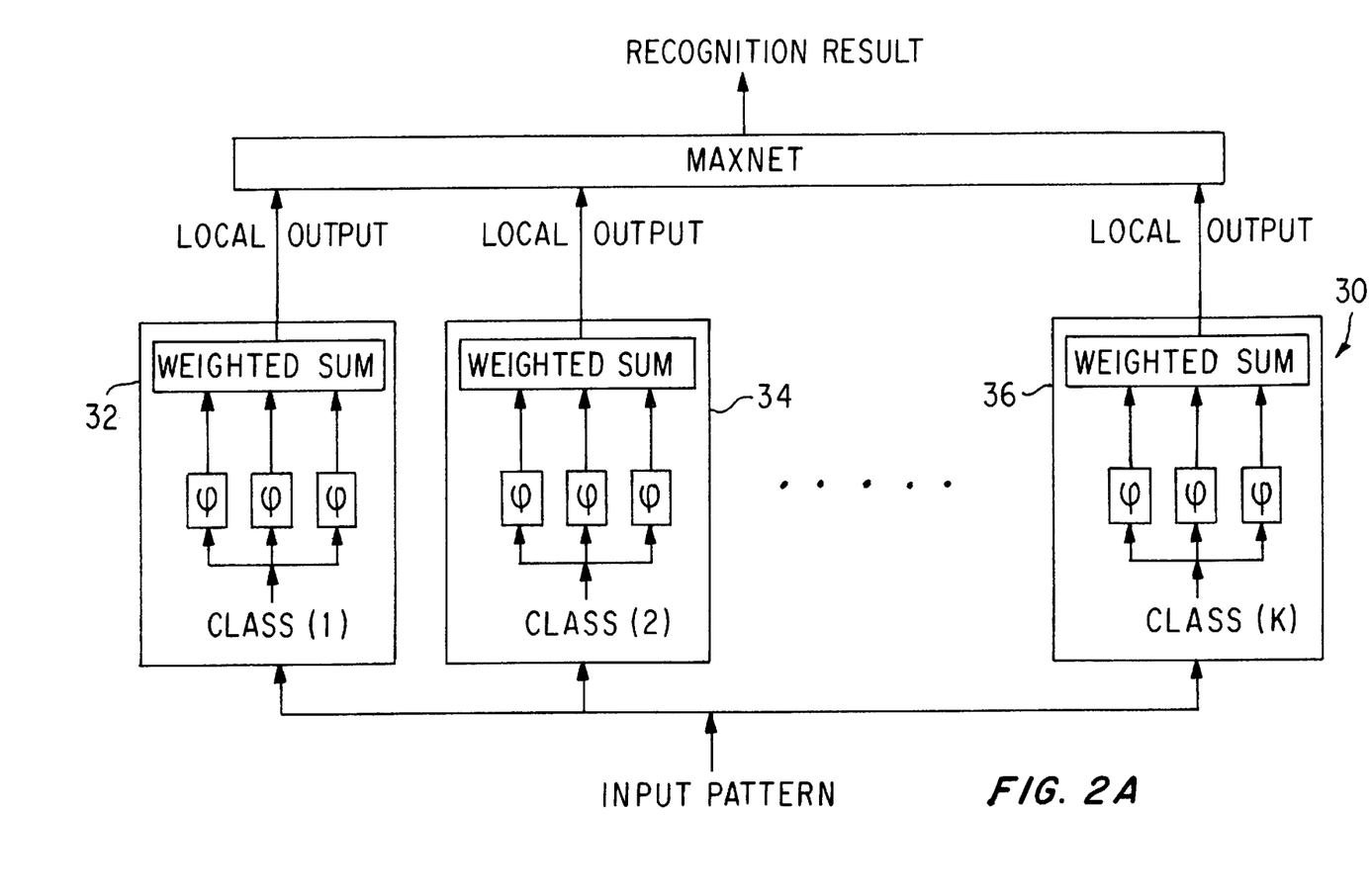
FIG. 2A is a schematic diagram of a DBNN.

Referring to FIG. 2A, a schematic diagram showing the DBNN used in the present invention designated by the numeral 30. As shown, the DBNN 30 adopts a One-Class-in-One-Network (OCON) structure, where one subnet is designated to one class only. Each subnet 32, 34 and 36 specializes in distinguishing its own class from the others, so the number of hidden units is usually small. Experimental results based on a broad range of applications (OCR, speech, and face recognition) suggest that 3–5 hidden units per subnet are preferred. The OCON structure of a DBNN makes it most suitable for incremental training, i.e., network upgrading upon adding/removing memberships.

The training scheme of the DBNN 30 is based on Locally Unsupervised Globally Supervised (LUGS) learning. There are two phases in this scheme: during the locally-unsupervised (LU) phase, each subnet is trained individually, and no mutual information across the classes may be utilized. After the LU phase is completed, the training enters the Globally-Supervised (GS) phase. In GS phase teacher information is introduced to reinforce or anti-reinforce the decision boundaries obtained during LU phase. The discriminant functions in all clusters will be trained in a two-phase learning technique comprising a global level and a local level. In the global level phase of learning, a supervised mutual (decision-based) learning rule is adopted. In the local level phase of learning, initialization is always by an unsupervised clustering method, such as a k-mean. If too many clusters are adopted, overfitting can result, which in turn will hamper the generalization capability. A proper number of clusters can be determined by an unsupervised clustering technique.

The learning rule of the DBNN 30 is very much decision-boundary driven. When pattern classes are clearly separated, such learning usually provides very fast and yet satisfactory learning performance. Application examples including OCR and (finite) face/object recognition. Different tactics are needed when dealing with overlapping distribution and/or issues on false acceptance/rejection, which arises in applications such as face recognition and verification. In such applications, the present invention provides a probabilistic variant of the DBNN as described earlier in connection with the face detector 14, eye localizer 18 and face recognizer 24 of the automatic face recognition system 10 of FIG. 1.

Figure 2B:
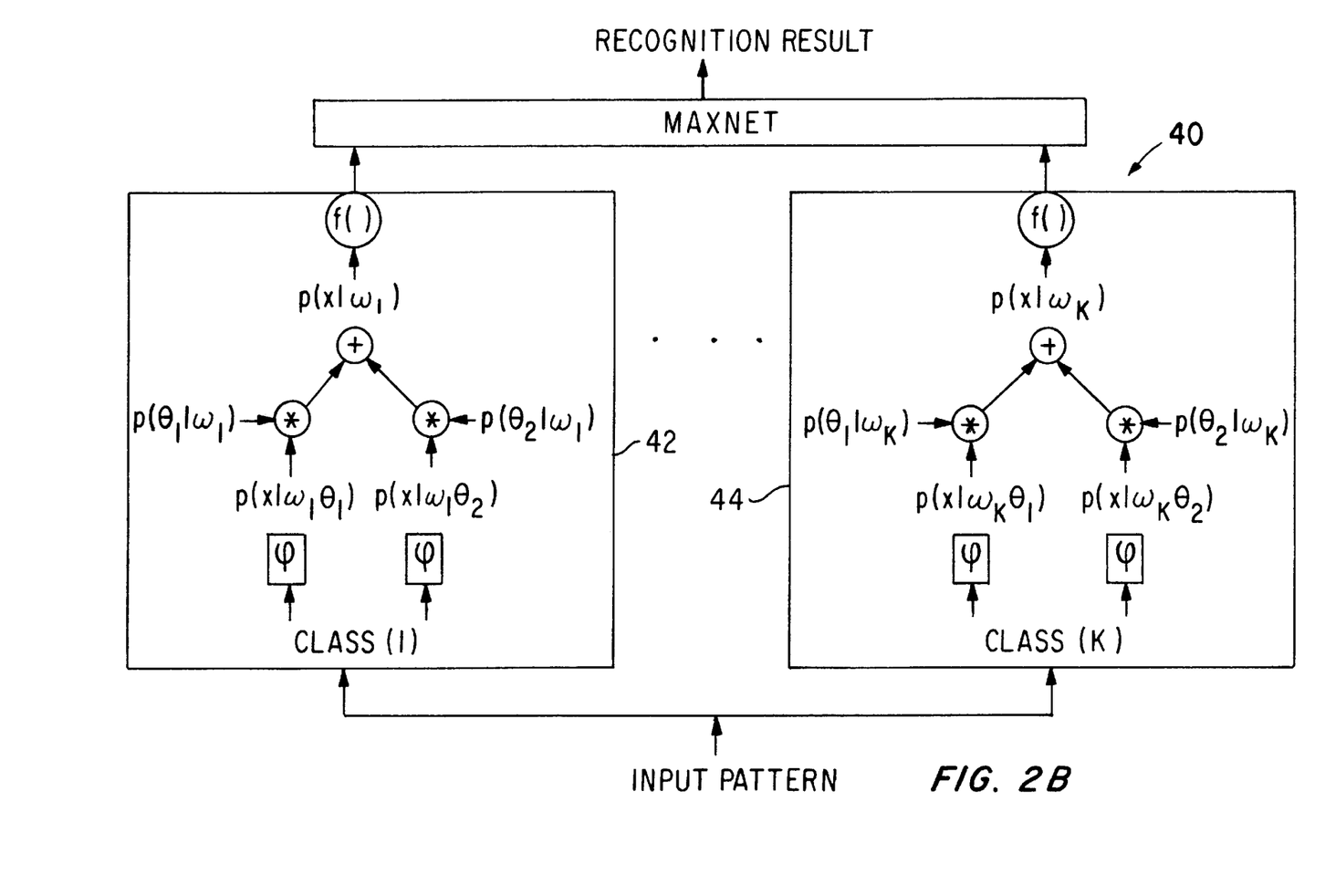
FIG. 2B is a structural depiction of a probabilistic DBNN according to the present invention.

Referring to FIG. 2B, an exemplary embodiment of a probabilistic DBNN denoted by the numeral 40 is schematically shown. The subnets 42 and 44 of the probabilistic DBNN 40 are designed to model log-likelihood functions. In the probabilistic DBNN 40, reinforced/antireinforced learning is applied to all the clusters of the global winner and the supposed (i.e. the correct) winner, with a weighting distribution proportional to the degree of possible involvement (measured by the likelihood) by each cluster.

The probabilistic DBNN 40 is designed to approximate the Bayesian posterior probabilities and likelihood functions. It is well known that the optimal data classifier is the Bayes classifier. Suppose there are M classes $\{\omega_1, \ldots, \omega_M\}$ in the feature space, the Bayes decision network classifies input patterns based on their posterior probabilities: Input x is classified to class $\omega_i$ if $P(\omega_i|x) > P(\omega_j|x)$, for all $j \neq i$. It can be shown that Bayes classifier has minimum error rate.

Suppose the likelihood density of input x given class $\omega_i$ is a D-dimensional Gaussian distribution, then posterior probability $P(\omega_i|x)$ can be obtained by Bayes rule:

$$P(\omega_i|x) = \frac{P(\omega_i)p(x|\omega_i)}{p(x)}, \quad p(x|\omega_i) = N(\mu_i, \Sigma_i)$$

where $P(\omega_i)$ is the prior probability of class $\omega_i$ (by definition $$\sum_{i=1}^{M} P(\omega_i) = 1), \text{ and } p(x) = \sum_{k=1}^{M} P(\omega_k)p(x|\omega_k).$$

The class likelihood function $p(x|\omega_i)$ can be extended to mixture of Gaussian distributions. Define $p(x|\omega_i, \Theta_r)$ to be one of the Gaussian distributions which comprise $p(x|\omega_i)$, $$p(x|\omega_i) = \sum_{r=1}^{R} P(\Theta_r|\omega_i)p(x|\omega_i, \Theta_r)$$

where $\Theta_\tau = \{\mu_\tau, \Sigma_\tau\}$ denotes the parameter set for the cluster $\tau$, $P(\Theta_\tau|\omega_i)$ denotes the prior probability of cluster $\tau$ when input patterns are from class $\omega_i$, and $p(x|\omega_i, \Theta_\tau) = N(\mu_\tau, \Sigma_\tau)$. By definition $$\sum_{r=1}^{R} P(\Theta_r|\omega_i) = 1.$$

In many applications it is appropriate to assume that $P(\omega_i) = P(\omega_j)$. Therefore the likelihood probability $p(x|\omega_i)$ can replace posterior probability $P(\omega_i|x)$ to serve as discriminant function.

The discriminant function of each subnet in the probabilistic DBNN models the log-likelihood function:

$$\phi(x, w_i) = \log p(x|\omega_i) = \log \left[ \sum_{r} P(\Theta_r|\omega_i) p(x|\Theta_r, \omega_i) \right] \quad (3)$$

Figure 3:
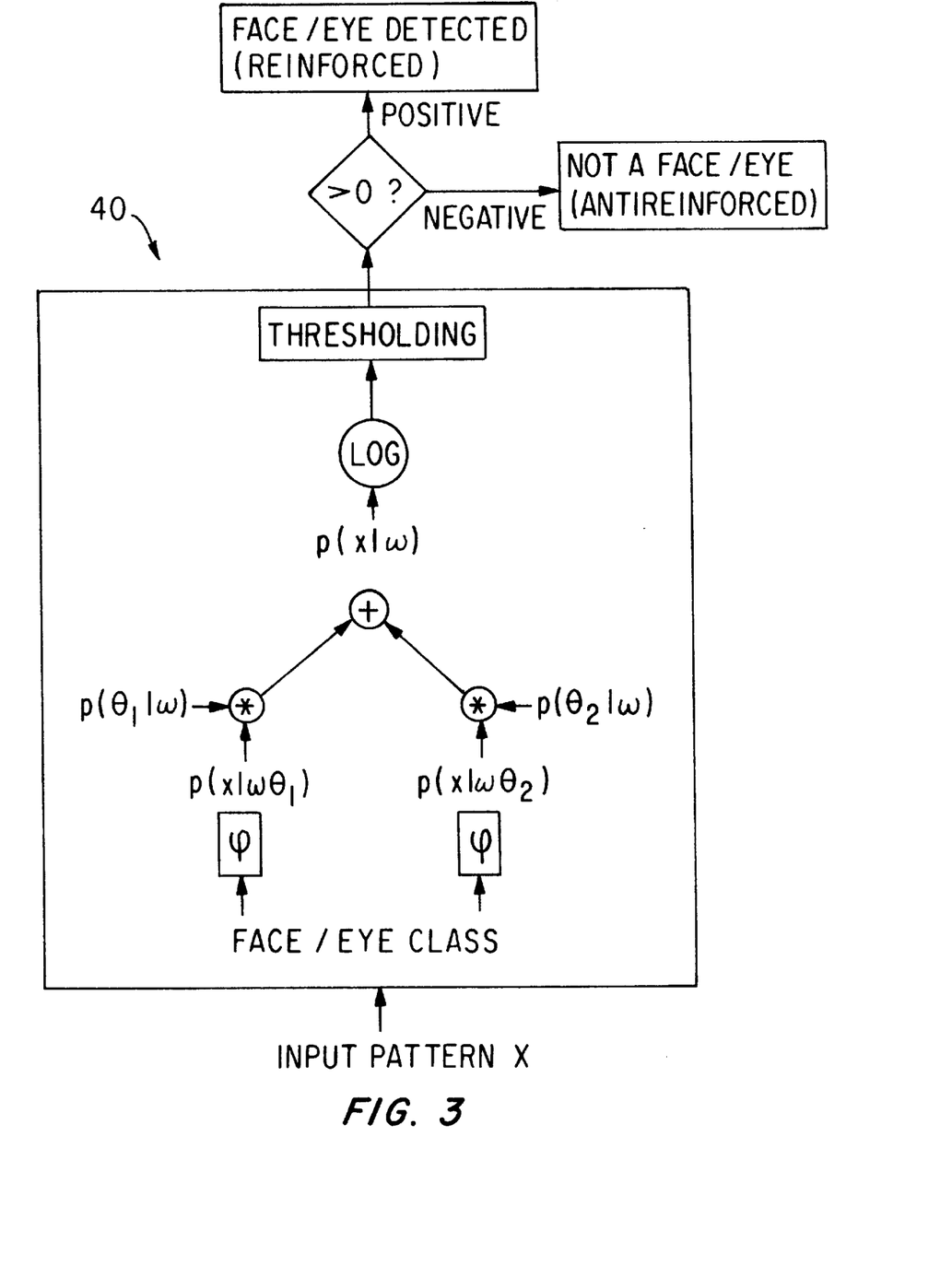
FIG. 3 is a schematic diagram of a probabilistic DBNN according to the present invention.

The overall diagram of such a discriminant function is depicted in FIG. 2B which shows the structure of the probabilistic DBNN. The function node $f( )$ is a nonlinearity operator. If we make the assumption of $P(\omega_i) = P(\omega_j)$, $f( )$ is a log operator (likelihood type). If $P(\omega_i) \neq P(\omega_j)$, $f( )$ is a normalization operator. Its purpose is to make the discriminant function approximate class posterior probability (posterior type). The DBNN shown in the exemplary embodiment is of the likelihood type. Note that an explicit teacher value would not be required, although it is a supervised training because the teacher's knowledge on correct classification is crucial in the training. In FIG. 3, a schematic diagram of the probabilistic DBNN 40 for deformable object detection is shown. The action described in the parentheses is for the learning phase only.

In the most general formulation, the basis function of a cluster should be able to approximate the Gaussian distribution with full-rank covariance matrix. A hyper-basis function (HyperBF) is meant for this. However, for those applications which deal with high dimensional data but finite number of training patterns, the training performance and storage space discourage such matrix modelling. A natural simplifying assumption is to assume uncorrelated features of unequal importance. That is, suppose that $p(I|\omega_i, \Theta_\tau)$ is a D-dimensional Gaussian distribution with uncorrelated features, that is, $$p(x|\omega_i, \Theta_r) = \frac{1}{(2\pi)^{D/2} \prod_d \sigma_{rd}} \exp\left(-\frac{1}{2} \sum_{d=1}^{D} \frac{(x_d - w_{rd})^2}{\sigma_{rd}^2}\right) \sim N(\mu_r, \Sigma_r) \quad (4)$$

where $\mu_\tau = [\omega_{\tau 1}, \omega_{\tau 2}, \ldots, \omega_{\tau D}]^T$ is the mean vector, and diagonal matrix $$\Sigma_\tau = diag[\sigma_{\tau 1}^2, \sigma_{\tau 2}^2, \ldots, \sigma_{\tau D}^2]$$

is the covariance matrix.

To approximate the density function in Eq. 4, we apply the elliptic basis functions (EBF) to serve as the basis function for each cluster:

$$\psi(x, \omega_i, \Theta_r) = -\frac{1}{2} \sum_{d=1}^{D} \frac{1}{\sigma_{rd}^2} (x_d - w_{rd})^2 + \theta_r \quad (5)$$

where $$\theta_r = -\frac{D}{2} \ln 2\pi - \sum_{d=1}^{D} \ln \sigma_{rd}.$$

After an exponential transform, $\exp\{\omega(x, \omega_i, \Theta_\tau)\}$ can be viewed the same Gaussian distribution as described in Eq. 4, except a minor notational change: $1/\alpha_{\tau d} = \sigma_{\tau d}^2$. In other words, $$\psi(x, \omega_i, \Theta_r) = -\frac{1}{2} \sum_{d=1}^{D} \alpha_{rd}(x_d - w_{rd})^2 + \theta_r \quad (6)$$

The learning rules for the probabilistic DBNN 40 is as follows. In the training scheme for the DBNN the LUGS principle is followed. The Locally Unsupervised (LU) phase for the probabilistic DBNN can adopt several unsupervised learning schemes such as, LVQ, k-mean, EM as so forth. As for the Globally Supervised (GS) learning, the decision-based learning rule is adopted. Suppose that the m-th training pattern $x^{(m)}$ is known to belong to $\omega_i$; and $$\phi(x^{(m)}, w_i^{(m)}) > \phi(x^{(m)}, w_l^{(m)}), \forall l \neq j \quad (7)$$

That is, the winning class for the pattern is the $j_{th}$ class (subnet). When and only when $j \neq i$, (i.e., when $x^{(m)}$ is misclassified), the following update will be performed:

Reinforced Learning: $w_i^{(m+1)} = w_i^{(m)} + \eta \nabla \phi(x, w_i)$

Antireinforced Learning: $w_j^{(m+1)} = w_j^{(m)} - \eta \nabla \phi(x, w_j) \quad (8)$ If the training pattern belongs to the so-called negative training (i.e. "unknown") set, then only the anti-reinforced learning rule will be executed—since there is no "correct" class to be reinforced.

The gradient vectors in Eq. 8 are computed as follows:

$$\frac{\partial \phi(x, w_i)}{\partial w_{rd}} = h_r(x) \cdot \alpha_{rd}(x_d - w_{rd}) \quad (9)$$

-continued $$\frac{\partial \phi(x, w_i)}{\partial \alpha_{rd}} = h_r(x) \cdot \frac{1}{2} \left( \frac{1}{\alpha_{rd}} - (x_d - w_{rd})^2 \right)$$

where $$h_r(x) = \frac{P(\Theta_r|\omega_i)p(x|\omega_i, \Theta_r)}{\Sigma_k P(\Theta_k|\omega_i)p(x|\omega_i, \Theta_k)}$$

$P(\Theta_r|\omega_i)$ (and $P(\omega_i)$, if $P(\omega_i) \neq P(\omega_j)$) can be learned by the EM algorithm: At epoch j, $$h_r^{(j)}(m) = \frac{P(\Theta_r|\omega_i)^{(j)}p(x^{(m)}|\omega_i, \Theta_r)}{\Sigma_k P(\Theta_k|\omega_i)^{(j)}p(x^{(m)}|\omega_i, \Theta_k)} \tag{10}$$

$$P(\Theta_r|\omega_i)^{(j+1)} = (1/N) \sum_{m=1}^{N} h_r^{(j)}(m)$$

$$P(\omega_i)^{(j+1)} = (1/N) \sum_{m=1}^{N} P(\omega_i|x^{(m)})^{(j)}$$

Since the probabilistic DBNN 40 provides probabilistic outputs, a similar procedure to the Neyman-Pearson hypothesis is followed for threshold updating. Accordingly, testing is performed by setting a threshold to the network outputs and computing the probability of false acceptance and false rejection. In order to find out the most possible regions for patterns from class $\omega_i$, it is preferred to choose a threshold $T_i$ so that an input x is classified to class $\omega_i$ if log $p(x|\omega_i) > T_i$. For an input x, if $x \in \omega_i$ but log $p(x|\omega_i) < T_i$, then $T_i$ should reduce its value. On the other hand, if $x \notin \omega_i$ but log $p(x|\omega_i) > T_i$, then $T_i$ should increase. An adaptive learning rule to train the threshold, $T_i$ is proposed in the present invention as follows: Define $d = T_i - \log p(x|\omega)$. Also define a cost function l(d). l(d) can be either a step function, a linear function, or a fuzzy-decision sigmoidal function. Once the network finishes the training, the threshold values can be trained as follows: Given positive learning parameter $\eta$, at step j, $$T_i^{(j+1)} = T_i^{(j)} - \eta l'(d) \text{ if } x \in \omega_i \text{ (reinforced learning)}$$

$$T_i^{(j+1)} = T_i^{(j)} + \eta l'(d) \text{ if } x \notin \omega_i \text{ (antireinforced learning)} \tag{11}$$

The following discussion details the technique used for generating training patterns for the probabilistic DBNN. Generally, there are three main aspects to the training pattern generation scheme used in the present invention.

The first aspect is the generation of virtual training patterns. In the beginning of the training phase, a certain number of facial images are selected to produce exemplar face/eye patterns for training the earlier described DBNN-based face detector and eye localizer. Typically, these exemplar face/eye patterns can be extracted manually from those images. For each exemplar pattern, virtual patterns can be generated by applying various affine transformations such as, rotation, scaling, shifting and mirroring process to the original pattern. By this method, each of the exemplar patterns is used to regenerate a number of up to 200 virtual training patterns.

The second aspect is the generation of positive/negative training patterns. Not all virtual training patterns are considered good face or eye patterns. If a virtual pattern is slightly perturbed from the original exemplar pattern, it will be included in the positive training set. This generally enhances the robustness of the neural network. On the other hand, if the perturbation exceeds a certain threshold (empirically established by trial-and-error), the virtual pattern will be included in the negative training set. When training the probabilistic DBNN, positive patterns are used for reinforced learning, and negative patterns are used for anti-reinforced learning.

The third aspect is the generation of run-time negative pattern. During the training phase, the probabilistic DBNN, while still under training, can be used to examine the whole image database every k epochs. If the network falsely detects a face (eye) somewhere in an image, then that particular subimage will be included into the negative training set.

Since the probabilistic DBNN is amenable to multi sensor classification, additional sensor information can be easily incorporated to improve the recognition performance. Two approaches to multi-sensor classification are possible in the present invention. The first approach involves a hierarchical classification, where sensor informations are cascaded in sequential processing stages. Possible candidates for hierarchical sensor are the hairline and the mouth. The second approach involves a multi-sensor fusion, where sensor informations are laterally combined to yield improved classification.

Figure 4:
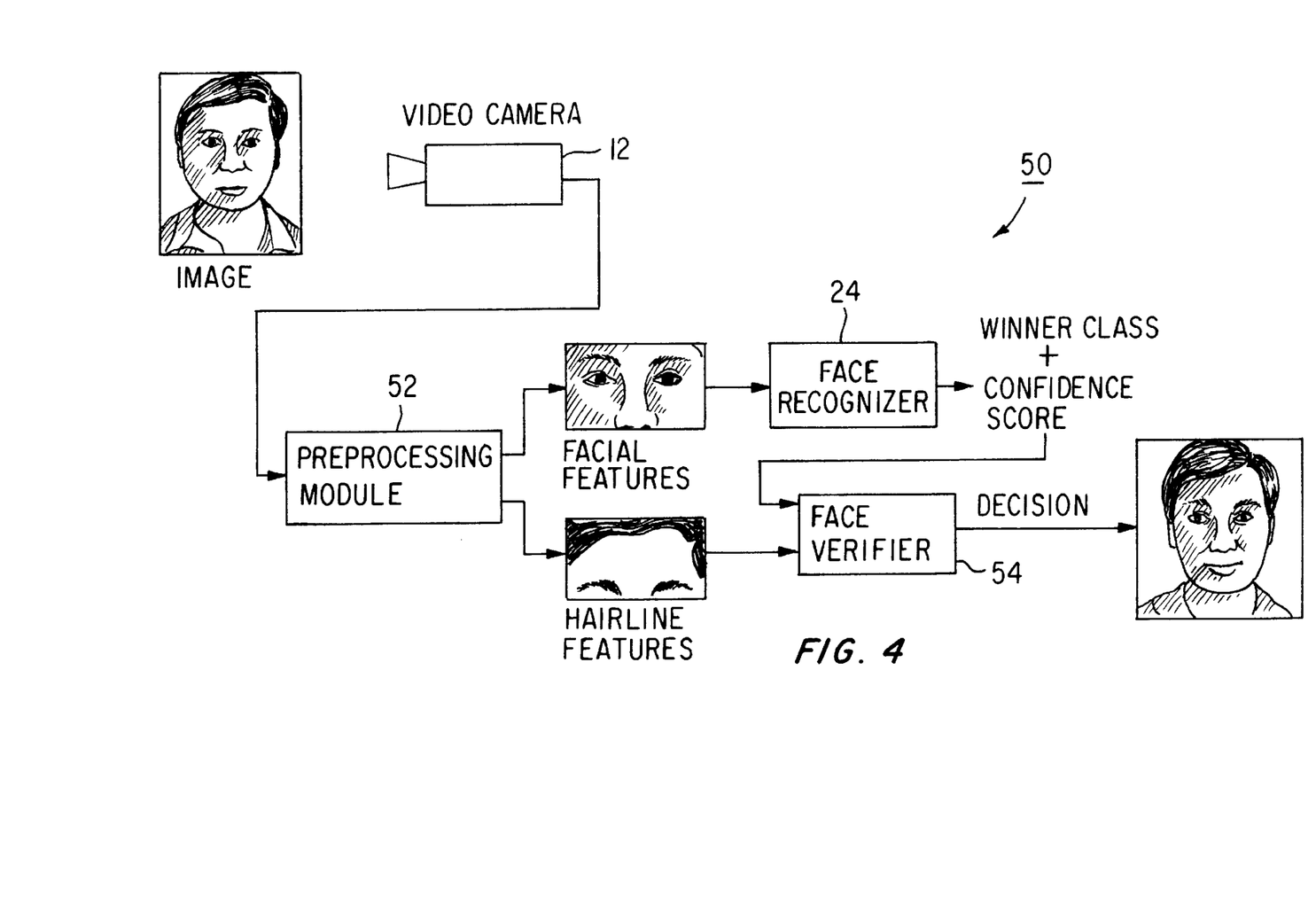
FIG. 4 is a diagrammatic view of second exemplary embodiment of the face locating and recognition system of the present invention which includes a face verifier.

Referring to FIG. 4, a hierarchical information processing system based on probabilistic DBNN is shown denoted by numeral 50. The system 50 is similar to the system of FIG. 1 and further includes a preprocessing module 52 which provides hairline or mouth features. In FIG. 4, hairline features are provided by the preprocessing module 52. The hairline images are inputted to face verifier 54 along with decisional information provided by the face recognizer 24. Generally, this system operates by cascading two processing stages. More specifically, a face verifier stage is cascaded after the (original) face recognizer stage. The face verifier 52 is itself is another DBNN classifier. Its function is to verify/reject the decision of the primary recognizer. The verifier can be trained by the decision-based learning rule. The input vector is a 12×8 feature vector obtained by down-sampling the forehead/hairline region of the face image. Three verification schemes are possible in this system.

In the first scheme, recall that each subnet of the primary DBNN recognizer generates a confidence score for an input pattern. Suppose that the highest scorer is the i-th subnet. If the confidence score of subnet i is below the threshold, the top choice of the face verifier is checked. If the best match of the forehead/hairline region is also class i, then class i is recognized and verified. Otherwise the test pattern is deemed as an intruder's. If the confidence score of subnet i is above the threshold, and if class i is among the top k (e.g. k=6) matches of the forehead/hairline region, the recognition is confirmed. Otherwise the person is rejected.

In the second scheme, similarity lists are introduced. Every class has its own similarity list. The list's lengths also vary from person to person. Initially, the similarity list of class j contains only class j itself. Assuming that the DBNN face verifier has now completed the training process by the decision-based learning rule. If a training pattern (originally from class j) is classified into another class, say, k, then the class k will be added to the similarity list of class j. This process will be repeated until all the training patterns of the known persons are tested.

In regard to the verification rule, if the confidence score of subnet i is below the threshold, the top choice of face verifier is checked. If the best match of the forehead/hairline region is also class i, then class i is recognized and verified. Otherwise the test pattern is deemed as an intruder's. If the confidence score of subnet i is above the threshold, and if the top one class of the face verifier is on the similarity list of class i, the recognition is confirmed. Otherwise the person is rejected.

The third scheme is the same as the second scheme, except the confirmation is now made more strict. More specifically, if the confidence score of subnet i is below the threshold, its recognition may still be confirmed if, the top choice of the face verifier is class i and its confidence score exceeds the threshold of the verifier. Otherwise the person will be rejected. If the confidence score of subnet i is above the threshold, the recognition can be confirmed, only if the top choice of the face verifier is on the similarity list of class i and its confidence score exceeds the threshold of the verifier. Otherwise the person will be rejected.

All three of these schemes substantially improve the performance of face recognizer. Experimental results have shown that the third scheme produces about the same (false acceptance+false rejection) rate as the second scheme does. The difference between these two schemes is that the false rejection rate of the third scheme is higher while the false acceptance rate is lower.

Figure 5:
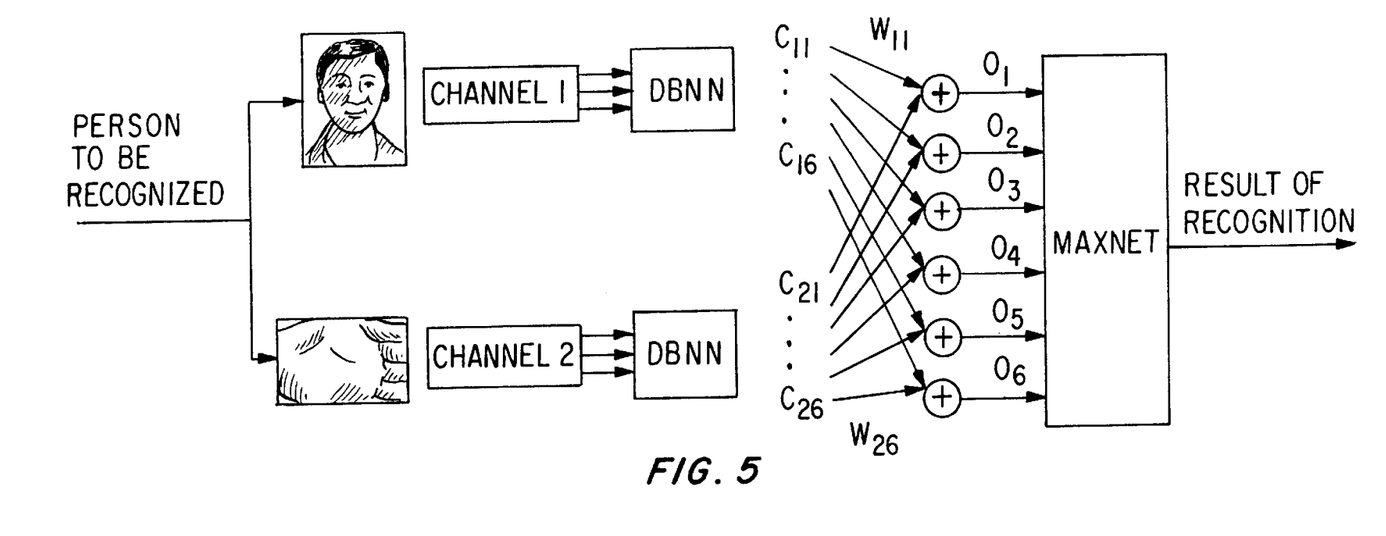
FIG. 5 is schematic diagram of a multi-channel DBNN according to the present invention.

Referring to FIG. 5, an exemplary embodiment of a multi-channel DBNN for multi-sensor biometric recognition is shown and denoted by the numeral 60. This approach consists of several classifier channels C1,1-C1,6 and C2,1-C2,6 each of which receives input vectors either from different sensors or from a portion of a higher dimensional feature vector. Here, the channels C1,1-C1,6 and C2,1-C2,6 are not differentiated into primary or secondary categories. Therefore, lateral fusion of information is more appropriate. The outputs of the channels are combined by some proper weightings W11–W26. The weighting factor is assigned based on the confidence the corresponding channel has on its recognition result. Since DBNN generates probabilistic outputs, it is natural to design the channel weightings to have probability properties. $C_{ki}$ is the output of the i-th subnet in channel k, which is equal to $p(x|\omega_i, C_k)$. Further note that the confidence measure is $W_{ki}=P(C_k|\omega_i)$ and that the combined output for subnet i is Oi, which is $p(x|\omega_i)$.

In class-dependent channel fusion, the weighting factors correspond to the confidence $P(C_k|\omega_l)$ for each channel. Here $P(C_k|\omega_l)$ represents the indicator on the confidence on channel k when the test pattern is originated from the $w_l$ class. (By definition, $$\sum_{k=1}^{K} P(C_k|\omega_i) = 1$$

so it has the property of a probability function.) Suppose that there are K channels in the subnet $w_l$, and within each channel there are R clusters. The probability model of the DBNN-based channel fusion network can be described as follows:

$$p(x|\omega_i) = \sum_{k=1}^{K} P(C_k|\omega_i)p(x|\omega_i, C_k) \quad (11A)$$

where $p(x|\omega_i, C_k)$ is the discriminant function of subnet i in channel k, and $p(x|\omega_i)$ is the combined discriminant function for class $\omega_i$. Note that $x=[x_1^T, \ldots, x_K^T]^T$, and since $p(x|\omega_i, C_k)$ is conditional on $C_k$, only $x_k$ is involved in the above formula. After all the parameters within channels complete their training, channel confidence $P(C_k|\omega_i)$ can be learned by the following: Define $\alpha_k=P(C_k|\omega_i)$. At beginning, assign $\alpha_k=1/K$, $\forall k=1, \ldots, K$.

At step j, $$h_k^{(j)}(m) = \frac{\alpha_k^{(j)} p(x^{(m)}|\omega_i, C_k)}{\sum_l \alpha_l^{(j)} p(x^{(m)}|\omega_i, C_l)} \quad \alpha_k^{(j+1)} = (1/N) \sum_{m=1}^{N} h_k^{(j)}(m) \quad (12)$$

Once the NN is trained, then the fusion weights will remain constant during the retrieving phase.

A more general version of multi-channel fusion, referred to as data-dependent channel fusion is also presented. Instead of using the likelihood of observing x given a class $(p(x|\omega_i, C_k))$ to model the discriminant function of each cluster, we shall use the posterior probabilities of electing a class given x $(p(\omega_i|x, C_k))$. For this version of the multi-channel network, a new confidence $P(C_k|x)$ is assigned, which stands for the confidence on channel k when the input pattern is x. Accordingly, the probability model is also modified to become $$P(\omega_i|x) = \sum_{k=1}^{K} P(C_k|x)P(\omega_i|x, C_k) \quad (12A)$$

$P(\omega_i|x, C_k)$ can be obtained by $P(\omega_i|x, C_k)=P(\omega_i|C_k)p(x|\omega_i, C_k)/p(x|C_k)$, and the confidence $P(C_k|x)$ can be obtained by the following equations:

$$P(C_k|x) = \frac{P(C_k)p(x|C_k)}{\sum_l P(C_l)p(x|C_l)} \quad (12B)$$

where $p(x|C_k)$ can be computed straightforwardly by equation $p(x|C_k)=$ $\Sigma_i P(\omega_i|C_k)p(x|\omega_i, C_k)$ and $P(C_k)$ can be learned by 12 (but replace $p(x|\omega_i, C_k)$ with $p(x|C_k)$). The term $P(C_k)$ can be interpreted as "the general confidence" we have on channel k.

Unlike the class-dependent approach, the fusion weights need to be computed for each testing pattern during the retrieving phase.

TEST RESULTS

Experimental test results are briefly summarized below. The probabilistic DBNN has consistently and reliably determined actual face positions, based on experiments performed on more than one thousand testing patterns. The probabilistic DBNN also yields very satisfactory eye localization performance. It is insensitive to small changes of the head size, the face orientation (up to approximately 30%), and the presence of eye glasses. The present invention is very robust against large variation of face features and eye shapes. The probabilistic DBNN takes only 200 ms on a SUN Sparc20 workstation to find human faces in an image with 320×240 pixels. For a facial image with 320×240 pixels, the probabilistic DBNN takes 500 ms to locate two eyes on a SUN Sparc20 workstation. Furthermore, because of the inherent parallel and distributed processing nature of DBNN, the technique can be easily implemented via specialized hardware for real time performance.

The following is an example of the application performance, which was based on the experimental performances on public (FERET) and in-house (SCR) databases. First, an experiment was conducted on 200-person (each with two front-views) of the ARPA/ARL FERET database. One image per person was used for training and the other for testing. A decision-boundary driven DBNN reached 100% in training accuracy and 96% in testing accuracy. An improved probabilistic variant of the DBNN achieved 99% recognition rate. The SCR 80×20 database consists of 80 people of different races, ages, and genders. The database contains 20 images for each person. If a person wears glasses, 10 of the images are with glasses and 10 are without glasses. The training set comprised 4 images per person. The testing set included 16 images per person, 1280 images in total. For all of the images, the DBNN-based face detector always correctly detected the center of the face thereby providing a 100% success rate. Eye localization is a more difficult task than face detection, in particular when eye glasses are present. Among the 1280 images, the DBNN-based eye localizer mis-detected the eyes in 5 images by errors of more than 5 pixels. For the remaining 1275 images, the DBNN-based face recognizer achieved 100% recognition rate. An SCR-IM 40×150 database offered an opportunity to experiment with much larger orientation and other variations. The database contained 150 images for each of 40 persons. The images were acquired continuously while the person slowly moved and rotated his head. Head rotations were not only by very wide angle (up to 45 degrees) but also along various axes (i.e., left-right, up-down, and tilted rotations). The DBNN-based face detector and the DBNN-based eye localizer worked correctly for 75% of the 6000 images in this database, which formed the so-called valid data set. A prior art face detector and eye localizer were trained only on frontal views. They could handle images up to only 30 degree rotations. The DBNN-based face recognizer achieved a very high 98% recognition rate.

The hierarchical DBNN-based face recognition system was tested with a 38-person face database. The hierarchical classification significantly reduces the false acceptance from 9.35% to 0% and the false rejection from 7.29% to 2.25%, as compared to non-hierarchical face recognition.

It should be understood that the embodiments described herein are merely exemplary and that a person skilled in the art may make many variations and modifications to these embodiments utilizing functionally equivalent elements to those described herein. Any and all such variations or modifications as well as others which may become apparent to those skilled in the art, are intended to be included within the scope of the invention as defined by the appended claims.

We claim:

1. A system for automatically detecting and recognizing the identity of a deformable object within an arbitrary image scene, said system comprising:

object detector means for determining whether said object is within said arbitrary image scene;

feature localizer means for determining the position of an identifying feature on said object, said feature locator means being coupled to said object detector means;

feature extractor means coupled to said feature localizer, for receiving coordinates sent from said feature localizer which are indicative of the position of said identifying feature and for extracting from said coordinates information relating to other features of said object which is used to create a low resolution image of said object; and object recognizer means for determining the identity of said object, said object recognizer means being coupled to said feature extractor means and being operative to receive said low resolution image of said object inputted from said feature extractor means to identify said object;

wherein said object detector means, said feature localizer means, and said object recognizer means are each implemented in a decision-based neural network;

wherein said decision-based neural network comprises a one-class-in-one network structure having a plurality of subnets and a plurality of classes, wherein each one of said subnets is designated to one of said classes in order to distinguish it from said other classes; and wherein said decision-based neural network includes a training scheme having a first phase and a second phase, wherein said first phase includes individually training each of said subnets without mutually exchanging information between said classes and said second phase includes reinforcing learning and anti-reinforcing learning obtained during said first phase.

2. The system according to claim 1, wherein said decision-based neural network comprises a probabilistic decision-based neural network, said reinforcing and anti-reinforcing learning being provided by a training pattern $X^{(m)}$ belonging to a class and:

$$\phi(x^{(m)}, w_j^{(m)}) > \phi(x^{(m)}, w_l^{(m)}), \forall l \neq j$$

wherein reinforced learning is performed according to:

$$w_i^{(m+1)} = w_i^{(m)} + \eta \nabla \phi(x, w_i)$$

and antireinforced learning is performed according to:

$$w_j^{(m+1)} = w_j^{(m)} - \eta \nabla \phi(x, w_j).$$

3. The system according to claim 1, wherein said decision-based neural network comprises a probabilistic decision-based neural network that includes a plurality of probabilistic outputs, each of which have a threshold value which is trained according to an adaptive learning rule:

$$T_i^{(j+1)} = T_i^{(j)} - \eta l'(d) \text{ if } x \in \omega_i \text{ (reinforced learning)}$$

$$T_i^{(j+1)} = T_i^{(j)} + \eta l'(d) \text{ if } x \notin \omega_i \text{ (antireinforced learning)}.$$

4. A system for automatically detecting and recognizing the identity of a deformable object within an arbitrary image scene, said system comprising:

object detector means for determining whether said object is within said arbitrary image scene;

feature localizer means for determining the position of an identifying feature on said object, said feature locator means being coupled to said object detector means;

feature extractor means coupled to said feature localizer, for receiving coordinates sent from said feature localizer which are indicative of the position of said identifying feature and for extracting from said coordinates information relating to other features of said object which is used to create a low resolution image of said object;

object recognizer means for determining the identity of said object, said object recognizer means being coupled to said feature extractor means and being operative to receive said low resolution image of said object inputted from said feature extractor means to identify said object;

wherein said object detector means, said feature localizer means, and said object recognizer means are each implemented in a probabilistic decision-based neural network; and wherein said probabilistic decision-based neural network comprises a plurality of subnets, each of said subnets having a plurality of cluster basis functions which include cluster prior probabilities according to:

$$\phi(x, w_i) = \log p(x|\omega_i) = \log \left[ \sum_r P(\Theta_r|\omega_i) p(x|\Theta_r, \omega_i) \right]$$

5. A system for automatically detecting and recognizing the identity of a deformable object within an arbitrary image scene, said system comprising:

object detector means for determining whether said object is within said arbitrary image scene;

feature localizer means for determining the position of an identifying feature on said object, said feature locator means being coupled to said object detector means;

feature extractor means coupled to said feature localizer, for receiving coordinates sent from said feature localizer which are indicative of the position of said identifying feature and for extracting from said coordinates information relating to other features of said object which is used to create a low resolution image of said object; and object recognizer means for determining the identity of said object, said object recognizer means being coupled to said feature extractor means and being operative to receive said low resolution image of said object inputted from said feature extractor means to identify said object;

wherein said object detector means, said feature localizer means, and said object recognizer means are each implemented in a probabilistic decision-based neural network; and wherein said probabilistic decision-based neural network comprises a plurality of subnets, each of said subnets includes a plurality of elliptic basis functions according to:

$$\psi(x, \omega_i, \Theta_r) = -\frac{1}{2} \sum_{d=1}^{D} \alpha_{rd}(x_d - w_{rd})^2 + \theta_r$$

6. A system for automatically detecting and recognizing the identity of a deformable object within an arbitrary image scene, said system comprising:

object detector means for determining whether said object is within said arbitrary image scene;

feature localizer means for determining the position of an identifying feature on said object, said feature locator means being coupled to said object detector means;

feature extractor means coupled to said feature localizer, for receiving coordinates sent from said feature localizer which are indicative of the position of said identifying feature and for extracting from said coordinates information relating to other features of said object which is used to create a low resolution image of said object; and object recognizer means for determining the identity of said object, said object recognizer means being coupled to said feature extractor means and being operative to receive said low resolution image of said object inputted from said feature extractor means to identify said object;

wherein said object detector means, said feature localizer means, and said object recognizer means are each implemented in a probabilistic decision-based neural network; and wherein said probabilistic decision-based neural network comprises a plurality of subnets, each of said subnets including a discriminant function which comprises a nonlinearity operator.

7. The system according to claim 6, wherein said discriminant function comprises a log operator which approximates a log-likelihood function:

$$\phi(x, w_i) = \log p(x|\omega_i) = \log \left[ \sum_r P(\Theta_r|\omega_i) p(x|\Theta_r, \omega_i) \right]$$

8. The system according to claim 6, wherein said discriminant function comprises a normalization operator which approximates a class posterior probability.

9. A system for automatically detecting and recognizing the identity of a deformable object within an arbitrary image scene, said system comprising:

object detector means for determining whether said object is within said arbitrary image scene;

feature localizer means for determining the position of an identifying feature on said object, said feature locator means being coupled to said object detector means;

feature extractor means coupled to said feature localizer, for receiving coordinates sent from said feature localizer which are indicative of the position of said identifying feature and for extracting from said coordinates information relating to other features of said object which is used to create a low resolution image of said object; and object recognizer means for determining the identity of said object, said object recognizer means being coupled to said feature extractor means and being operative to receive said low resolution image of said object inputted from said feature extractor means to identify said object;

wherein said object detector means, said feature localizer means, and said object recognizer means are each implemented in a probabilistic decision-based neural network; and further comprising object verifier means implemented as a probabilistic decision-based neural network for verifying the decision of said object recognizer means, said object verifier receiving additional information about said object which is cascaded in sequential processing stages in a hierarchical manner by said object verifier.

10. A system for automatically detecting and recognizing the identity of a deformable object within an arbitrary image scene, said system comprising:

object detector means for determining whether said object is within said arbitrary image scene;

feature localizer means for determining the position of an identifying feature on said object, said feature locator means being coupled to said object detector means;

feature extractor means coupled to said feature localizer, for receiving coordinates sent from said feature localizer which are indicative of the position of said identifying feature and for extracting from said coordinates information relating to other features of said object which is used to create a low resolution image of said object; and object recognizer means for determining the identity of said object, said object recognizer means being coupled to said feature extractor means and being operative to receive said low resolution image of said object inputted from said feature extractor means to identify said object;

wherein said object detector means, said feature localizer means, and said object recognizer means are each implemented in a probabilistic decision-based neural network; and wherein said probabilistic decision-based neural network comprises a plurality of classifier channels each having an output, said outputs being laterally fused by weighting said channels.

11. A system for automatically detecting and recognizing the identity of a deformable object within an arbitrary image scene, said system comprising:

object detector means for determining whether said object is within said arbitrary image scene;

feature localizer means for determining the position of an identifying feature on said object, said feature locator means being coupled to said object detector means;

feature extractor means coupled to said feature localizer, for receiving coordinates sent from said feature localizer which are indicative of the position of said identifying feature and for extracting from said coordinates information relating to other features of said object which is used to create a low resolution image of said object; and object recognizer means for determining the identity of said object, said object recognizer means being coupled to said feature extractor means and being operative to receive said low resolution image of said object inputted from said feature extractor means to identify said object;

wherein said object detector means, said feature localizer means, and said object recognizer means are each implemented in a probabilistic decision-based neural network; and wherein said probabilistic decision-based neural network comprises a plurality of classifier channels each having an output, said outputs being laterally fused by class-dependent channel fusion according to:

$$p(x|\omega_i) = \sum_{k=1}^{K} P(C_k|\omega_i)p(x|\omega_i, C_k)$$

12. A system for automatically detecting and recognizing the identity of a deformable object within an arbitrary image scene, said system comprising:

object detector means for determining whether said object is within said arbitrary image scene;

feature localizer means for determining the position of an identifying feature on said object, said feature locator means being coupled to said object detector means;

feature extractor means coupled to said feature localizer, for receiving coordinates sent from said feature localizer which are indicative of the position of said identifying feature and for extracting from said coordinates information relating to other features of said object which is used to create a low resolution image of said object; and object recognizer means for determining the identity of said object, said object recognizer means being coupled to said feature extractor means and being operative to receive said low resolution image of said object inputted from said feature extractor means to identify said object;

wherein said object detector means, said feature localizer means, and said object recognizer means are each implemented in a probabilistic decision-based neural network; and wherein said probabilistic decision-based neural network comprises a plurality of classifier channels each having an output, said outputs being laterally fused by data-dependent channel fusion according to:

$$P(\omega_i|x) = \sum_{k=1}^{K} P(C_k|x)P(\omega_i|x, C_k)$$

$$P(C_k|x) = \frac{P(C_k)p(x|C_k)}{\sum_l P(C_l)p(x|C_l)}$$

13. A system for automatically detecting and recognizing the identity of a deformable object within an arbitrary image scene, said system comprising:

object detector means for determining whether said object is within said arbitrary image scene;

feature localizer means for determining the position of an identifying feature on said object, said feature localizer means being coupled to said object detector means;

feature extractor means coupled to said feature localizer, for receiving coordinates sent from said feature localizer which are indicative of the position of said identifying feature and for extracting from said coordinates information relating to other features of said object which is used to create a low resolution image of said object; and object recognizer means for determining the identity of said object, said object recognizer means being coupled to said feature extractor means and being operative to receive said low resolution image of said object inputted from said feature extractor means to identify said object, wherein said object detector means, said feature localizer means, and said object recognizer means are each implemented in a decision-based one-class-in-one neural network structure having a plurality of subnets and a plurality of classes, wherein each one of said subnets is designated to one of said classes in order to distinguish it from said other classes, wherein said neural network includes a training scheme having a first phase and a second phase, wherein said first phase includes individually training each of said subnets without mutually exchanging information between said classes and said second phase includes reinforcing learning and anti-reinforcing learning obtained during said first phase.

* * * * *